Patented Mar. 18, 1947

2,417,685

UNITED STATES PATENT OFFICE 2,417,685

SEPARATION OF ETHYLENE CHLOROHYDRIN FROM HIGHER CHLOROHYDRINS

Joseph R. Heard, Jr., New York, N. Y., assignor to Wyandotte Chemicals Corporation, Wyandotte, Mich., a corporation of Michigan No Drawing. Application March 29, 1944, Serial No. 528,649

11 Claims. (Cl. 260—348.6)

This invention relates to the manufacture of alkylene oxides from the corresponding chlorohydrins, and refers more particularly to the production of ethylene oxide almost free from the higher alkylene oxides.

An object of this invention is to obtain a separation of mixed chlorohydrins by conversion into different chemical compounds of the same general type and separating these derivatives. A particular object is to convert the mixed chlorohydrins of ethylene, propylene, butylene and higher members into the corresponding ethylene-, propylene-, butylene-, and higher oxides, but making use of the different rate of reaction to achieve a separation of ethylene oxide from the higher members.

It has been proposed to separate ethylene, propylene and other olefines by low temperature distillation methods, such as used in the liquid air industry in the separation of gases in the air. It has, furthermore, been proposed to form the corresponding alkylene oxides and then to separate these. But the methods employed in the said separation are unlike the present method. By one older mode the mixture of ethylene and propylene oxides is distilled under pressure, and by another mode these oxides are chilled by brine at atmospheric pressure, then separated. By still another suggested method these oxides are reacted with other chemicals, such as water and the resulting glycols fractionally distilled preferably under vacuum.

The method of the present invention avoids these relatively expensive and complicated steps. The basis for the efficient separation which I achieve resides in the different rates of reaction of the respective chlorohydrins with alkaline materials such as the hydroxides of the alkali- and alkaline earth metals. This in turn affords a ready means of separating ethylene, propylene and other higher olefines because these can readily be converted into corresponding chlorohydrins. I have found that propylene chlorohydrin reacts with inorganic alkalis in aqueous solution about 12 to 15 times as fast at room temperature as ethylene chlorohydrin. Higher members of the series react about the same rate as propylene chlorohydrin. So far as known, I am the first to make and record the determination of these relative rates of reaction. A fortiori no one has worked out or devised a practical method of separating ethylene chlorohydrin from propylene-, and higher chlorohydrins based upon a use of this abstract fact in a feasible, yet inexpensive and simple method.

The equipment required has the advantage in that it is far less expensive and less extensive than distillation equipment, on which previously proposed processes have depended.

Having outlined above the general principles of the invention, the following example is given for purpose of illustration and not in limitation.

Example

A mixture of propylene chlorohydrin and ethylene chlorohydrin in the molar ratio of 1:2 was treated with a 10% aqueous slurry of slaked lime, i. e., $Ca(OH)_2$ in an amount barely equivalent to the propylene chlorohydrin present therein, plus that needed to neutralize any acid present. After being allowed to react a few minutes, such as 5 minutes, at room temperature or slightly lower (20° C.), the mixture was then pumped to a fractionating tower held at about 100° C. by the presence of live steam. The fractionating tower was surmounted by a reflux condenser held at 55° C. in order to return the unreacted ethylene chlorohydrin and condensed steam to the tower. This caused propylene oxide to be volatilized. The liquid from the bottom of this tower was then passed to a reaction vessel or to a fractionating tower similar to the first, where it was further treated at about 100° C. in the presence of steam with calcium hydroxide slurry sufficient in amount to set free all of the remaining ethylene chlorohydrin as ethylene oxide. This second tower was also surmounted by a reflux condenser held at 55° C. or lower to prevent chlorohydrins from being volatilized with the steam.

The distillate obtained from the first reaction vessel or flash separator consisted of approximately 90% propylene oxide and 10% ethylene oxide; that from the second reaction vessel consisted of approximately 10% propylene oxide and 90% ethylene oxide. In each instance the distillate coming off was mixed with some water vapor.

In the above example the reason for the selection of the 1:2 ratio of propylene chlorohydrin to ethylene chlorohydrin was that propylene and ethylene, from which this is obtained, occurs in about that proportion in the olefines resulting from a single pass heat cracking of petroleum.

In addition runs where a somewhat higher proportion of $Ca(OH)_2$ was used in the first stage, an ethylene oxide of 95% or better purity was obtained in the second stage, but the propylene oxide was correspondingly less pure in the preceding stage.

In the above example the concentration of the chlorohydrin solution was 100 grams per liter, but the process works equally well at concentration of 5% or 20% as at 10%.

Instead of slaked lime, other alkalis such as dilute caustic soda, caustic potash, sodium carbonate or barium hydroxide may be used and in the claims these are generically covered by the word "alkali."

The above description and example are intended to be illustrative only. Many modifications of or variations therefrom may be made, provided any of the step or steps or equivalent thereof, within the following claims be employed.

I claim:

1. In the method of producing propylene oxide, the steps of reacting an aqueous mixture of propylene chlorohydrin to ethylene chlorohydrin in the approximate ratio of 1:2 with an amount of alkali approximately equivalent to the propylene chlorohydrin and any free acid present at about room temperature, then distilling off propylene oxide of about 90% purity.

2. In the method of producing ethylene oxide and propylene oxide, the steps of reacting a liquid mixture of propylene chlorohydrin to ethylene chlorohydrin in the approximate ratio of 1:2 with an amount of alkali approximately equivalent to the propylene chlorohydrin and any free acid present at about room temperature, then distilling off propylene oxide of a purity of about 90%, then reacting the liquid residual ethylene chlorohydrin with additional alkali whereby there is distilled off a product analyzing approximately 90% ethylene oxide.

3. The process set out in claim 2 wherein the concentration of the chlorohydrin solution treated is about 10%.

4. In the process for producing alkylene oxides from mixed olefine chlorohydrins containing ethylene chlorohydrin and higher members of the series, the steps of mixing an alkali with said chlorohydrins at a temperature not above room temperature and in an amount sufficient to react selectively with said higher series members but less than the amount to convert the major proportion of said ethylene chlorohydrin to ethylene oxide, and distilling off the alkylene oxides higher in the series than ethylene oxide.

5. In the process for producing alkylene oxides from mixed olefine chlorohydrins containing ethylene chlorohydrin and higher members of the series, the steps of mixing an alkali with an aqueous solution of said chlorohydrins at a temperature not above room temperature and in an amount sufficient to react selectively with said higher series members but less than the amount to convert the major proportion of said ethylene chlorohydrin to ethylene oxide, distilling off the alkylene oxides higher in the series than ethylene oxide, then reacting the residual chlorohydrins with additional alkali whereby the ethylene chlorohydrin therein is converted to ethylene oxide.

6. In the process for separately producing ethylene oxide and propylene oxide from starting materials consisting of mixed olefine chlorohydrins, the steps of intimately contacting an alkali with a mixture of ethylene chlorohydrin and propylene chlorohydrin at a temperature not above room temperature and in an amount approximately sufficient to react selectively with only the latter to convert it to propylene oxide and less than the amount to convert said ethylene chlorohydrin to ethylene oxide, distilling off the so-formed propylene oxide, then reacting the residual liquid ethylene chlorohydrin with additional alkali and subjecting it to distillation whereby relatively pure ethylene oxide is distilled off.

7. In the process of producing propylene oxide, the step of intimately contacting an alkali with an aqueous mixture of ethylene chlorohydrin and propylene chlorohydrin at a temperature not above room temperature and in an amount approximately sufficient to react selectively with only the latter to convert the major proportion of it to propylene oxide and less than the amount to convert more than a minor proportion of said ethylene chlorohydrin to ethylene oxide, and distilling off said propylene oxide.

8. The process set out in claim 6 wherein the alkali is calcium hydroxide.

9. The process set out in claim 7 wherein the alkali is calcium hydroxide.

10. In the process for producing alkylene oxides from solutions of mixed olefine chlorohydrins containing ethylene chlorohydrin and higher members of the series, the steps of reacting at about 20° C. an alkali with the chlorohydrins in an amount sufficient to react selectively with said higher series members but less than the amount to convert the major proportion of said ethylene chlorohydrin to ethylene oxide, then flash heating said mixture whereby higher alkylene oxides are distilled off.

11. In the process for producing alkylene oxides from mixed olefine chlorohydrins containing ethylene chlorohydrin and higher members of the series, the steps of reacting at about 20° C. an alkali with the chlorohydrins in an amount sufficient to react selectively with said higher series members but less than the amount to convert the major proportion of said ethylene chlorohydrin to ethylene oxide, flash heating said mixture whereby higher olefine oxides are distilled off, then reacting the residual chlorohydrins with additional alkali and subject the resultant reaction mixture to distillation whereby relatively pure ethylene oxide is distilled off.

JOSEPH R. HEARD, Jr.

REFERENCES CITED

The following references are of record in the file of this patent:

UNITED STATES PATENTS

| Number | Name | Date |
| --- | --- | --- |
| 1,446,872 | Brooks | Feb. 27, 1923 |
| 972,953 | Walker | Oct. 18, 1910 |

FOREIGN PATENTS

| Number | Country | Date |
| --- | --- | --- |
| 292,066 | British | 1929 |
| 495,676 | British | 1938 |